Aug. 24, 1965  L. J. PIANOWSKI  3,202,261
TRANSFER MECHANISM
Original Filed Jan. 7, 1959  5 Sheets-Sheet 4

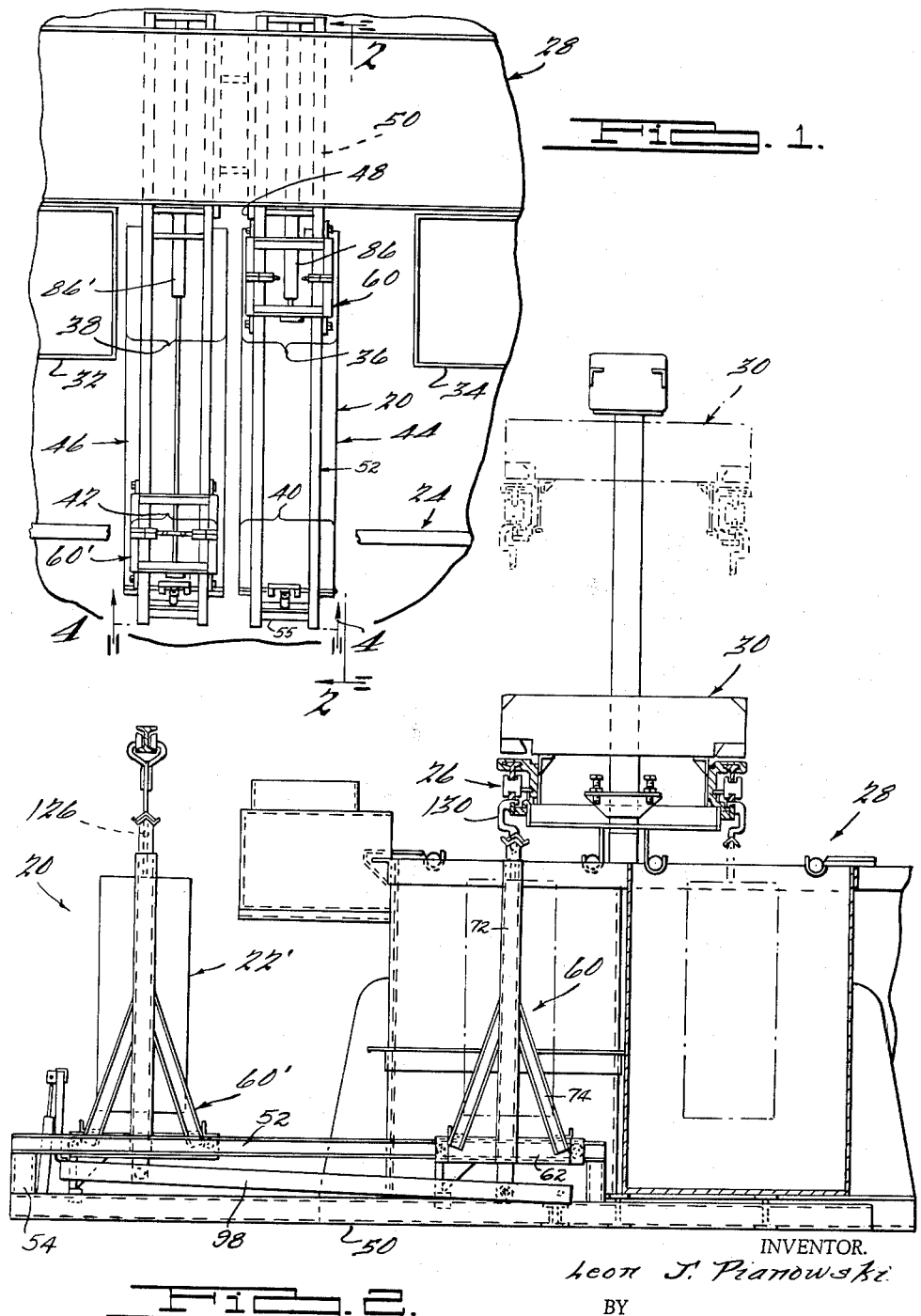

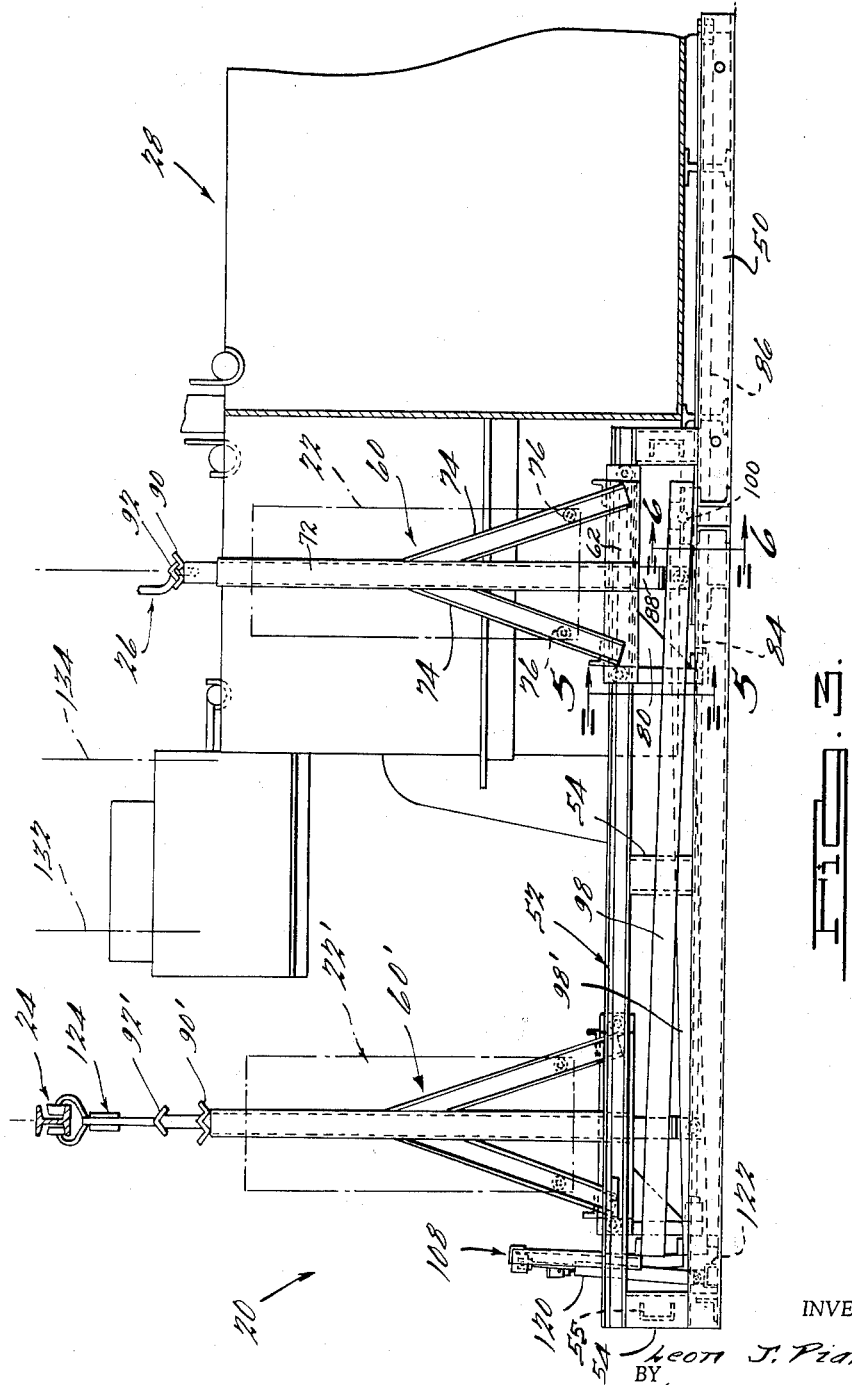

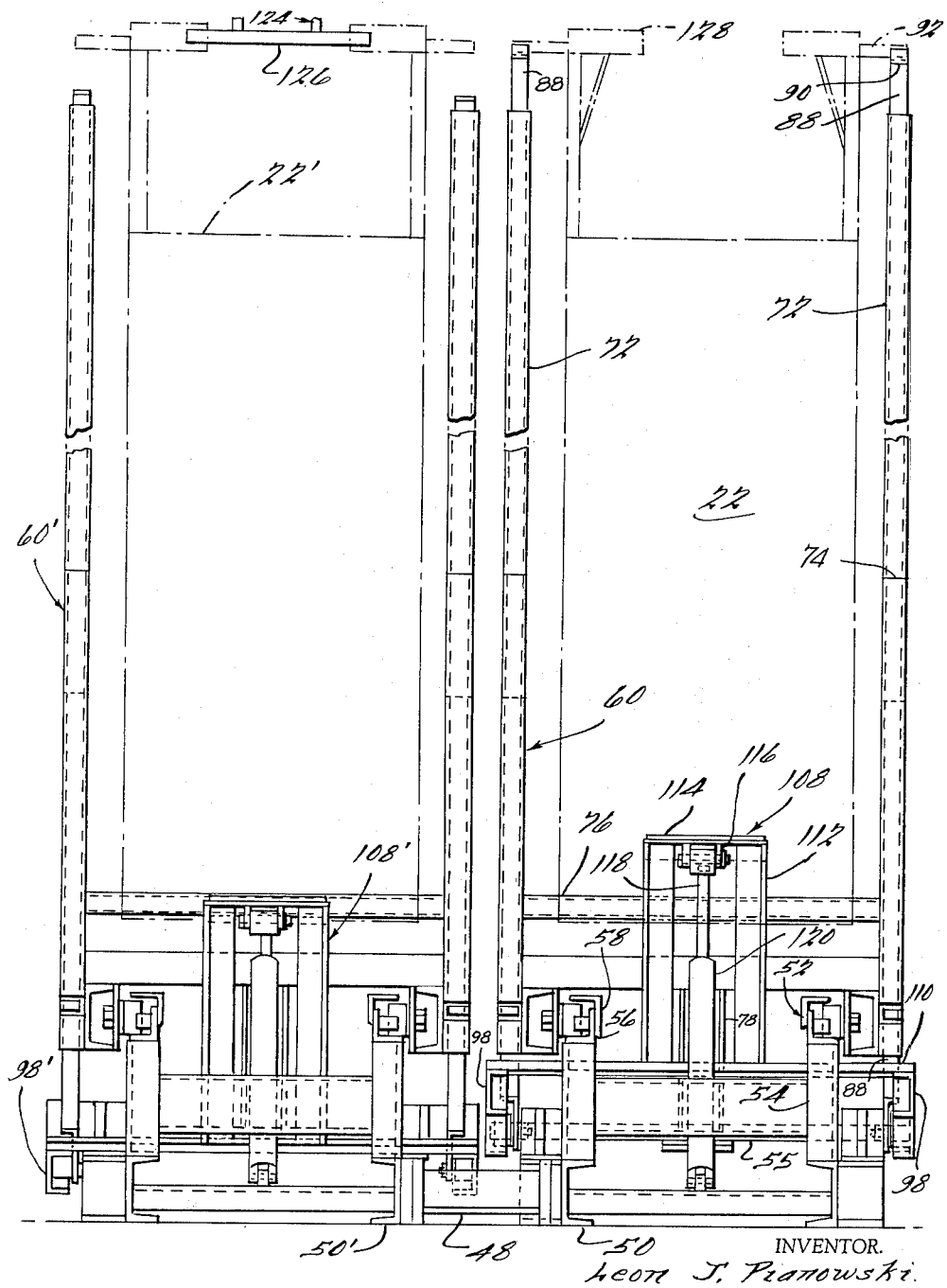

INVENTOR.
Leon J. Pianowski.
BY
Harness, Dickey & Pierce
ATTORNEYS.

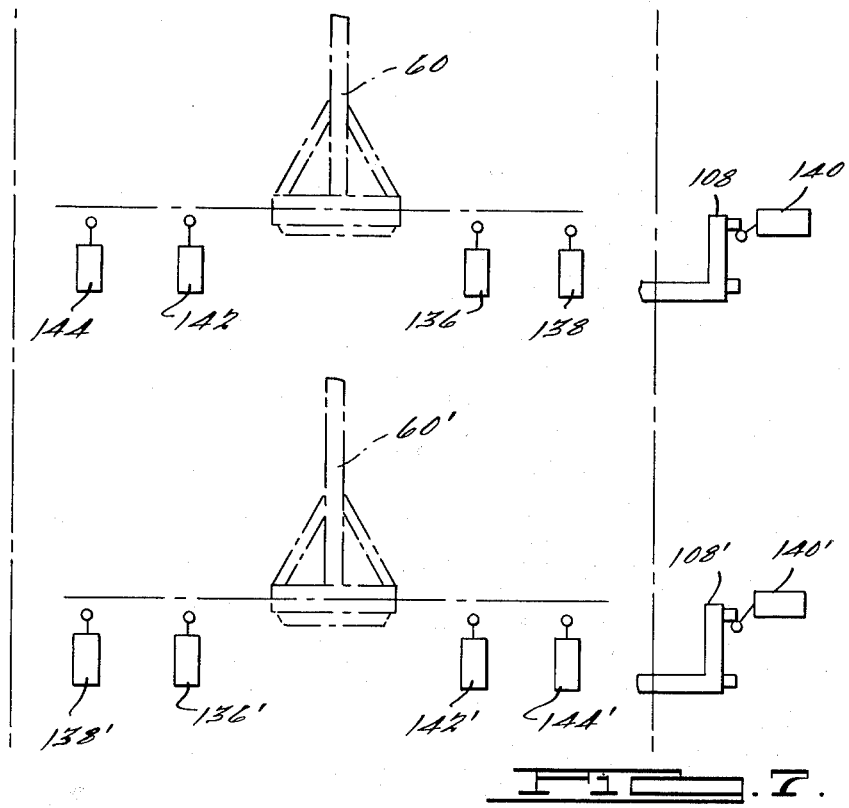

United States Patent Office 3,202,261
Patented Aug. 24, 1965

3,202,261
TRANSFER MECHANISM
Leon J. Pianowski, Detroit, Mich., assignor to The Udylite Corporation, Detroit, Mich., a corporation of Delaware
Original application Jan. 7, 1959, Ser. No. 785,479, now Patent No. 3,123,197, dated Mar. 3, 1964. Divided and this application June 6, 1963, Ser. No. 293,551
8 Claims. (Cl. 198—20)

The present invention relates to an improved transfer mechanism of the type used to transfer article carrying racks from one conveyor to another. More particularly, the present invention contemplates the provision of an improved transfer mechanism for use in automatically transferring such racks between intermittently moving conveyors or intermittently moving portions of conveyors. The present application is a division of my prior copending patent application Serial No. 785,479, filed January 7, 1959, now U.S. Patent No. 3,123,197.

While transfer mechanisms of this type have a wide variety of applications, the preferred embodiment illustrated and described herein illustrates the use of the improvements of the present invention in a transfer mechanism for transferring racks carrying articles to be electroplated, from an intermittently moving shop conveyor or portion thereof, while it is stopped, to an automatic plating machine, and transferring racks carrying processed, or plated articles, from the plating machine to the shop conveyor.

It is an object of the present invention to provide an improved transfer mechanism of the above mentioned type, which is simple in design, easily manufactured, durable in construction, and reliable and efficient in operation.

It is an object of the present invention to provide an improved transfer mechanism for transferring work carrying racks between first and second conveyors and in which a cart shuttles back and forth between the conveyors and is provided with rack supporting means which moves vertically only, relative to the cart, the latter being provided with guide means which prevents horizontal movement of the rack supporting means relative to the cart.

It is also an object of the present invention to provide an improved transfer mechanism of the above mentioned type which includes means providing delay safety positions and means successively moving a cart to transfer stations at each of the conveyors and then stopping it in a delay safety position intermediate the conveyors.

Another object of the present invention is to provide an improved transfer mechanism of the above mentioned type including a cart movable between a transfer station of the first conveyor and a transfer station of the second conveyor, and which includes a rack support which is adapted to carry a rack during movement of the cart in one direction between said stations and which includes means for gradually moving the rack support vertically in one direction during such rack carrying movement of the cart.

It is also an object of the invention to provide an improved transfer mechanism of the above mentioned type including a cart having a vertically movable rack support and rack support positioning means which is movable while the cart is in one of said stations to move the rack support vertically in one direction and which is movable while the cart is in the other station so that during movement of the cart from the unloading station to the loading station, the rack support is gradually moved vertically in the opposite direction.

A further object is to provide an improved transfer mechanism which provides vertical movement of the rack support for transferring of a rack between one conveyor and the transfer mechanism, but in which the transfer mechanism does not provide any substantial vertical movement of the rack support while the cart is at the other conveyor, the transfer between such other conveyor and the transfer mechanism being in response to vertical movement of a part of such other conveyor.

It is also an object of this invention to provide an improved transfer mechanism for automatically transferring article carrying racks from a first conveyor to a loading station of a second conveyor and simultaneously transferring article carrying racks from an unloading station of the second conveyor to the first conveyor.

Other and more detailed objects of the present invention will be appreciated by those skilled in the art from a consideration of the following specification, the appended claims and the accompanying drawings wherein;

FIGURE 1 is a broken plan view illustrating partially diagrammatically a transfer mechanism embodying the present invention disposed for effecting transfers between a shop conveyor and an automatic plating machine;

FIGURE 2 is a sectional view of the structure illustrated in FIGURE 1, taken substantially along the line 2—2 thereof, but showing the position of the transfer mechanism just prior to the lowering of the rack onto the shop conveyor hook;

FIGURE 3 is an enlarged view similar to FIGURE 2 showing the position of the transfer mechanism after the transfer of a rack to the shop conveyor;

Figure 5:
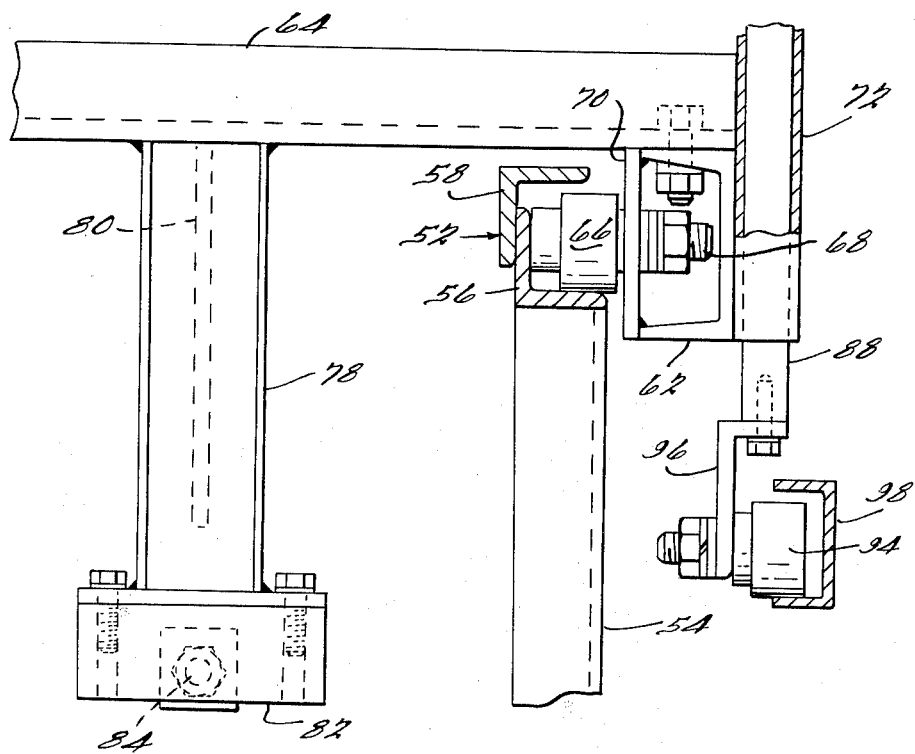
Figure 6:
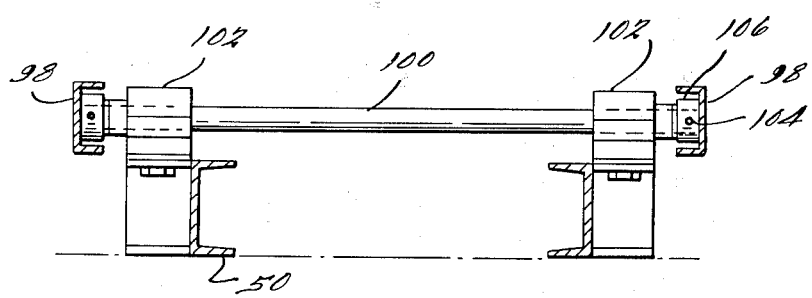

the structure illustrated in FIGURE 1, taken substantially from the line 4—4 thereof;

FIGURES 5 and 6 are broken enlarged sectional views of the structure illustrated in FIGURE 3, taken substantially along the lines 5—5 and 6—6 thereof, respectively; and FIGURE 7 is a diagrammatic view showing the limit switch arrangement for the transfer mechanism illustrated in FIGURES 1 to 6, inclusive.

Referring to the drawings, and particularly to FIGURES 1 to 6 thereof, the transfer mechanism of the present invention is generally indicated at 20 and in the application thereof there illustrated, is employed to transfer work supporting racks 22 between a shop conveyor 24 and the conveyor 26 of an automatic electroplating machine 28. In the particular machine illustrated in FIGURES 1, 2 and 3, the machine conveyor 26 is carried by a machine chassis 30 which moves between a lower position illustrated in full lines in FIGURE 2, and a raised position illustrated in broken lines in FIGURE 2, and the machine 28 has at one side thereof a space between tanks 32 and 34 thereof providing a loading station 36 and an unloading station 38. The shop conveyor 24 has corresponding stations designated unloading station 40 and loading station 42. In the transfer mechanism 20 of FIGURES 1 to 6, inclusive, there are two substantially identical units 44 and 46, the unit 44 constituting a loader which is here so designated because it loads the plating machine 28, and the unit 46 constituting an unloader for the machine 28. These units are interconnected and held in spaced parallel relation by a spacer frame 48 and are disposed with the loader 44 extending between the unloading station 40 of the shop conveyor 24 and the loading station 36 of the plating machine 28, and the unloader 46 extending between the unloading station 38 of the machine 28 and the loading station 42 of the conveyor 24.

Because of the identity of construction of the units 44 and 46, only the loader 44 will be described in detail, the corresponding parts of the unloader 46 being designated by the same numeral with a prime mark, where reference thereto is believed to facilitate understanding of the invention. The loader 44 comprises a fabricated base frame 50 which is connected to the unloader base 50' by the spacer frame 48.

The loader base 50 extends from the shop conveyor unloader station 40 past the machine loading station 36 and underneath the tank at the opposite side of the machine, as best illustrated in FIGURE 1. A pair of tracks 52 are mounted on the base 50 and extend longitudinally thereof at opposite sides thereof between the conveyor unloading station 40 and the machine loading station 36 and are supported in spaced parallel relation above the base 50 on uprights 54 interconnected by transverse braces 55. In the preferred embodiment illustrated, these tracks 52 are formed of angles 56 and 58 which define outwardly facing channels. A cart generally indicated at 60 is mounted on the tracks 52 for movement between the unloading station 40 and the loading station 36. This cart 60 comprises a pair of inwardly facing channels 62 interconnected by transverse members 64 and which carry, as best illustrated in FIGURE 5, rollers 66 adapted to roll within the outwardly facing channels of the tracks 52, the rollers 66 rolling along the horizontal flanges of the lower angles 56.

As illustrated in FIGURE 5, each roller 66 is carried on a bolt member 68 which extends through and is supported on a plate 70 welded across the inwardly facing channel 62. The cart 60 also includes, at opposite sides thereof, vertically extending tubular posts 72, the lower ends of which are welded to the outer faces of the channels 62, as best illustrated in FIGURE 5 centrally thereof. The posts 72 are additionally supported by inclined braces 74 secured at their upper ends to the posts 72 and secured at their lower ends to the channels 62 adjacent the opposite ends thereof. These braces 74 are interconnected by tubes 76 extending transversely of the cart to further support the posts 72 against movement transversely of the cart. The transverse frame member 64 at the outer or left-hand end of the cart, as viewed in FIGURE 3, carries a depending channel 78 braced by a gusset plate 80 and which carries at its lower end a bracket 82 to which is connected the outer end of a piston rod 84 of a hydraulic cylinder 86 which is mounted in the base 50 and disposed longitudinally and centrally thereof.

Each tubular post 72, which is secured to the cart frame as above described, carries an inner movable post 88 extending outwardly of both ends of the post 72. At its upper end the post 88 carries a pair of angles welded thereto to provide a W-shaped rack support 90 which is adapted to receive and support a downwardly opening V-shaped arm 92 extending laterally outwardly of the rack 22. At its lower end the movable post 88, as best illustrated in FIGURE 5, carries a roller 94 supported on an angle 96 for rotation about a horizontal axis. Each roller 94 is received in a lift track 98 in the shape of an inwardly facing channel extending longitudinally of the loader below the track 52 and externally of the uprights 54 upon which it is supported. Referring to FIGURES 6 and 3, each lift track 98 is pivotally supported at its inner or right-hand end as viewed in FIGURE 3, upon a transversely extending pivot bar 100 rotatably supported at opposite sides of the frame 50 in bearing blocks 102. The bar 100 is connected to the lift tracks 98 by pins 104 extending through a collar 106 which is welded within the lift track 98 and receives the end of the pivot bar 100.

At its outer, or left-hand end, each lift track 98 is secured to a lift frame generally indicated at 108. The lift frame 108 comprises a transversely extending angle 110, the opposite ends of which are secured to the top of the lift tracks 98 at the outer or left-hand ends thereof. Adjacent its center the angle 110 has an inverted generally U-shaped frame portion 112 extending upwardly therefrom. The transversely extending angle 114 constituting the web portion of this U-shaped frame portion also serves to mount a bracket 116 providing a pivotal connection for the upper end of the piston rod 118 of a hydraulic cylinder 120, the lower end of the cylinder 120 being pivotally mounted on a transversely extending base member 122.

It will now be appreciated that when the cart 60 is in the loading station 40 of the shop conveyor 24, movement of the lift track 98 from its lower position, which is the position in which the lift track 98 is shown in FIGURE 3, upwardly to the position in which the lift track 98 is shown in FIGURE 3, will cause the movable post 88 and hence, the W-shaped rack support 90, at its upper end, to be raised. It will also be appreciated that the movable rack support post 88 may be gradually raised or lowered during movement of the car 60 depending upon the position of the lift rack 98 which will serve as a ramp along which the roller 94 will travel.

The shop conveyor 24 has spaced therealong a plurality of supports generally indicated at 124 which are movable therealong and which include a horizontally extending bar 126 adapted to engage under laterally inwardly extending inverted V-shaped support arms 128 provided on the racks 22. From the foregoing description it will be appreciated that the cart 60 is moved, in the construction illustrated in FIGURES 1 to 6, inclusive, by the supply of hydraulic pressure to the hydraulic cylinder 86, and that the lift track 98 is moved to control the position of the rack support 90 by controlling the pressure in the hydraulic cylinder 120. It will, of course, be appreciated that the carts 60 and 60' must be moved in proper timed relation to the operation of the shop conveyor 24 and the conveyor 26 of the automatic plating machine 28. The shop conveyor 24 forms no part of the present invention and may be of any construction such that the supports 124 are moved to and from and stopped in the unloading and loading stations 40 and 42, respectively, of the conveyor 24.

Similarly, the automatic plating machine 28 and its conveyor 26 form no part of the present invention and may be of any construction in which the chassis 30 is moved between the positions illustrated in FIGURE 2 and in which the conveyor 26 is provided with rack supports 130 which are moved to and from and are stopped in the machine unloading and loading stations 38 and 36, respectively.

From the foregoing description of the construction of the improved transfer mechanism of the present invention, it will be appreciated that the operation involves the transfer of a rack 22 carrying raw or unplated work from the shop conveyor 24 to the loader cart 60 at the conveyor unloading station 40, movement of the cart 60 to the machine conveyor loading station 36 and the transfer at that station of the rack 22 from the cart 60 to the machine conveyor 26. During these steps in the operation another rack 22' carrying plated work is simultaneously being transferred from the machine conveyor 26 at the unloading station 38 thereof to the cart 60', thence carried by the cart 60' to the loading station 42 of the shop conveyor 24 and there transferred from the cart 60' to the conveyor 24.

It will be appreciated that this general operation may be provided by any suitable control system, a controlling consideration being that the control of the transfer mechanism 20 is interlocked with the control of the automatic plating machine 28 and of the conveyor 24 to prevent damage to the equipment. To this end delay safety positions are provided at which the carts 60 and 60' stop until the conveyors are ready for them to effect their simultaneous loading and unloading transfers. The delay safety position of the cart 60 of the loader 44 is indicated in FIGURE 3 by the center line 132 and the delay safety position of the cart 60' of the unloader 46 is indicated by the center line 134. The loader cart 60 stops at the center line 132 when it is moving away from the machine conveyor 26 and the unloader cart 60' stops at the center line 134 when it is moving away from the shop conveyor 24. This may be accomplished in any suitable way as, for example, by limit switches 136 and 136' diagrammatically illustrated in FIGURE 7 which control the supply of liquid to the hydraulic cylinders 86 and 86'. When a rack support 124 of the shop conveyor reaches the unloading station 40 it actuates a limit switch (not shown), which starts the cart 60 of the loader toward the unloading station 40. As the cart 60 reaches unloading station 40, it actuates limit switch 138 which both stops the cart 60 by stopping the flow of liquid to cylinder 86 and supplies liquid to hydraulic cylinder 120 which raises the lift frame 108 and with it the lift track 98, the movable post 88 and the rack support 90 which lifts the rack 22 from the conveyor support 24. As the lift frame 108 reaches its upper limit of travel it actuates a limit switch 140 which starts the cart 60 toward the machine conveyor 26 and its loading station 36. As the cart 60, now carrying a rack 22 approaches the machine conveyor loading station 36, it may actuate a limit switch 142 causing the cart 60 to proceed toward loading station 36 at a reduced speed. Upon reaching loading station 36, the loader cart 60 is stopped by actuating limit switch 144 which also lowers the lift frame 108 and track 98 and starts the machine chassis 30 up. The lift frame 108 is stopped at its lower limit by again actuating limit switch 140 which also starts the loader cart 60 toward its delay safety position 132 at which it is stopped by actuating limit switch 136.

The cart 60' of the unloader 46 is started toward the machine conveyor 26 from its delay safety position 134 when the machine conveyor 26 has completed a transfer movement of the racks along the conveyor, which it effects while the chassis 30 is in its raised position. Upon completing this upper transfer movement a limit switch (not shown) is actuated which starts the machine chassis 30 down and also starts the cart 60' of the unloader 46 toward the machine and its unloading position 38. As the unloader cart 60' reaches this unloading position 38, it actuates a limit switch 138' which stops the cart 60' in the unloading position 38 and raises the lift frame 108' and the lift track 98'. When the lift frame 108' reaches the upper limit of its movement it actuates limit switch 140' stopping the lift frame 108' in its upper position and starting the unloader cart 60' toward the shop conveyor 24, provided the machine chassis has reached the lower limit of its travel and actuated a circuit preparing limit switch (not shown). This downward movement of the machine chassis 30 transfers a rack 22' of plated work from the machine conveyor 26 to the cart 60'. The unloader cart 60' then proceeds toward the shop conveyor 24 and the loading station 42 thereof and as it approaches the loading station, it may actuate a limit switch 142' causing the cart 60' to proceed toward the loading station 36' at a reduced speed. Upon reaching loading station 42, the unloader cart 60' is stopped by actuating limit switch 144' which also lowers lift frame 108' to transfer the rack 22' from the cart 60' to one of the supports 124 of the conveyor 24. As the lift frame 108' reaches its lower limit, it actuates limit switch 140' which stops it in its lower position and starts the unloader cart 60' toward its delay safety position 134. This actuation of the limit switch 140' also starts the conveyor 24. The unloader cart 60' proceeds toward and is stopped at its delay safety position 134 by actuating the limit switch 136'. The carts 60 and 60' remain in their respective delay safety positions 132 and 134 until they are again started toward the shop conveyor 24 and the machine conveyor 26, respectively, as described above.

Any suitable electric circuit and hydraulic system may be employed for providing the above described cycle of operation of the transfer mechanism. A suitable electric circuit and hydraulic system will be apparent to one skilled in the art and accordingly, the specific details of the electrical circuit and hydraulic system form no part of the present invention and are not included in the present disclosure.

In the embodiment of the invention illustrated in FIGURES 1 through 7, inclusive, the transfer mechanism comprises a pair of similar units 44 and 46 which operate simultaneously, one loading the automatic plating machine 28 from the shop conveyor 24, while the other is unloading the plating machine and transferring the racks to the shop conveyor.

While only several specific embodiments of the invention have been illustrated and described herein, it will be readily appreciated by those skilled in the art that numerous modifications and changes may be made without departing from the spirit of the present invention.

What is claimed is:

1. In combination, a transfer mechanism for use in transferring work carrying racks between a first conveyor and a second conveyor, both of which have supports spaced therealong adapted to carry said racks and both of which have a loading station and an unloading station and stop periodically at said stations, said transfer mechanism comprising a first track extending between the unloading station of said first conveyor and the loading station of said second conveyor, a second track extending between the unloading station of said second conveyor and the loading station of said first conveyor, a loading cart on said first track, an unloading cart on said second track, means for moving said carts along said tracks rack supporting means on each of said carts movable vertically relative thereto, means including a pivotally mounted lift track engageable with said rack supporting means for raising said rack supporting means of said loading cart while it is at said unloading station of said first conveyor for picking up a rack therefrom, means including a pivotally mounted lift track engageable with said rack supporting means for lowering said rack supporting means of said unloading cart while it is at said loading station of said first conveyor for transferring a rack thereto, and means preventing substantial vertical movement of each of said rack supporting means relative to its cart while its cart is at one of said stations of said second conveyor.

2. Transfer mechanism as defined in claim 1, wherein said lift tracks are pivoted adjacent the position of said follower means when its cart is in a said position at said second conveyor.

3. Transfer mechanism as defined in claim 1, including means preventing horizontal movement of each rack supporting means relative to its cart.

4. In combination, a transfer mechanism for use in transferring work carrying racks between a first conveyor and a second conveyor, both of which have supports spaced therealong adapted to carry said racks and both of which have a loading station and an unloading station and stop periodically at said stations, said transfer mechanism comprising a first track extending between the unloading station of said first conveyor and the loading station of said second conveyor, a second track extending between the unloading station of said second conveyor and the loading station of said first conveyor, a loading cart on said first track, an unloading cart on said second track, means for moving said carts along said tracks, rack supporting means on each of said carts movable vertically relative thereto, a first ramp extending longitudinally of said first track and a second ramp extending longitudinally of said second track, follower means on each said rack supporting means movably engageable with said first and said second ramp, respectively; means for raising one end of said first ramp and said rack supporting means of said loading cart while it is at said unloading station of said first conveyor for picking up a rack therefrom, and means for lowering one end of said second ramp and said rack supporting means of said unloading cart while it is at said loading station of said first conveyor for transferring a rack thereto, said first ramp and said second ramp being ineffective, upon operation thereof between a raised position and a lowered position, when the rack supporting means upon which it operates is in one of said stations of said second conveyor, to produce any substantial vertical movement of said rack supporting means.

5. In combination, a transfer mechanism for use in transferring work carrying racks from a first conveyor at an unloading station thereof and to a second conveyor at a loading station thereof, both of which conveyors have supports spaced therealong adapted to carry said racks and stop periodically at said stations, said transfer mechanism comprising a stationary frame having a horizontally disposed track extending between said stations, a cart mounted on said frame for movement along said track, drive means for moving said cart along said track, rack supporting means mounted on said cart for vertical movement relative thereto, co-operating means including a ramp mounted on said frame and follower means on said rack supporting means engaging said ramp effective, responsive to movement of said cart from said unloading station to said loading station by said drive means, to move said rack supporting means vertically in one direction, and means operable while said cart is at one of said stations for moving said ramp relative to said frame and said rack supporting means vertically in the opposite direction.

6. Transfer mechanism as defined in claim 5, wherein said ramp is pivotally mounted on said frame at a point remote from the position of said follower means when said cart is at said one of said stations.

7. Transfer mechanism as defined in claim 5, wherein said ramp is pivotally mounted on said frame at a point adjacent the position of said follower means when said cart is at the other of said stations, wherein said means for moving said ramp pivots said ramp in one direction, and wherein said means operable while said cart is at said one of said stations, is also operable while said cart is at said other of said stations to pivot said ramp in the opposite direction.

8. Transfer mechanism for use in transferring work carrying racks between a first conveyor and a second conveyor, both of which have supports spaced therealong adapted to carry said racks and both of which have a loading station and an unloading station and stop periodically at said stations, said transfer mechanism comprising a first track extending between the unloading station of said first conveyor and the loading station of said second conveyor, a second track extending between the unloading station of said second conveyor and the loading station of said first conveyor, a loading cart on said first track, an unloading cart on said second track, means for moving said carts along said tracks, rack supporting means on each of said carts movable vertically relative thereto, means for raising said rack supporting means of said loading cart while it is at said unloading station of said first conveyor for picking up a rack therefrom, means for lowering said rack supporting means of said unloading cart while it is at said loading station of said first conveyor for transferring a rack thereto, co-operating means including a ramp on said first track and follower means on said rack supporting means of said loading cart effective responsive to movement of said loading cart relative to said ramp from said unloading station of said first conveyor to said loading station of said second conveyor to lower said rack supporting means of said loading cart, and other cooperating means including a second ramp on said second track and second follower means on said rack supporting means of said unloading cart effective responsive to movement of said unloading cart relative to said second ramp from said unloading station of said second conveyor to said loading station of said first conveyor to raise said rack supporting means of said unloading cart.

References Cited by the Examiner

UNITED STATES PATENTS 2,806,577    9/57    Lang _____ 198—20

SAMUEL F. COLEMAN, *Primary Examiner.*

ERNEST A. FALLER, *Examiner.*

UNITED STATES PATENT OFFICE
CERTIFICATE OF CORRECTION

Patent No. 3,202,261　　　　　　　　　　　　　　　August 24, 1965

Leon J. Pianowski

It is hereby certified that error appears in the above numbered patent requiring correction and that the said Letters Patent should read as corrected below.

Column 2, line 28, before "the" insert -- FIGURE 4 is an enlarged broken elevational view of --.

Signed and sealed this 5th day of April 1966.

EAL)

test:

NEST W. SWIDER　　　　　　　　　　　　　　　EDWARD J. BRENNER
testing Officer　　　　　　　　　　　　　　　　　Commissioner of Patents